United States Patent [19]

Feltrin

[11] 4,404,948
[45] Sep. 20, 1983

[54] FUEL SYSTEMS FOR INTERNAL COMBUSTION ENGINES

[76] Inventor: Galiano Feltrin, R. R. #1, Stoney Point, Ontario, Canada

[21] Appl. No.: 194,109

[22] Filed: Oct. 6, 1980

[51] Int. Cl.³ .............................................. F02M 31/00
[52] U.S. Cl. ................................... 123/546; 123/545; 123/547; 123/552; 261/144
[58] Field of Search ............... 123/545, 546, 552, 547; 261/144, 145

[56] References Cited

U.S. PATENT DOCUMENTS

| | | | |
|---|---|---|---|
| 1,487,234 | 3/1924 | Guthrie | 123/545 |
| 1,945,178 | 1/1934 | Carter | 123/546 |
| 2,108,639 | 2/1938 | Bicknell | 123/545 |
| 2,319,752 | 5/1943 | Smith | 123/545 |
| 2,473,808 | 6/1949 | Mallory | 123/545 |
| 3,221,719 | 12/1965 | Ulrich | 123/546 |
| 3,444,848 | 5/1969 | Lawrence | 123/545 |
| 3,640,256 | 2/1972 | Low | 123/546 |
| 4,044,741 | 8/1977 | Swingley | 261/145 |
| 4,151,820 | 5/1979 | Furacz | 123/545 |
| 4,167,165 | 9/1979 | Finlay | 123/546 |
| 4,192,270 | 3/1980 | Beckman | 261/145 |

Primary Examiner—Ronald H. Lazarus

[57] ABSTRACT

A fuel system of an internal combustion engine includes a heat exchanger through one side of which hot engine coolant is passed as a heating medium, and through the other side of which a mixture of fuel and air is passed. The heat exchanger has substantial heat exchanging surface area and the path of the fuel air mix through the heat exchanger is relatively long. A bypass is provided by which fuel and air may bypass the heat exchanger during cold engine operating conditions.

6 Claims, 2 Drawing Figures

FUEL SYSTEMS FOR INTERNAL COMBUSTION ENGINES

BACKGROUND OF THE INVENTION

This invention is concerned with fuel systems for internal combustion engines. A typical fuel system comprises a tank, a fuel pump delivering fuel from the tank to a carburetor or other device for atomizing the fuel and mixing that fuel with air, and an intake conduit leading from the carburetor or other device to the combustion chamber of the engine or, in a multi-cylinder engine, more usually to a manifold which distributes the fuel and air mixture to the cylinders.

It is recognized that to improve engine efficiency it is desirable to obtain vaporization of the fuel or at least as fine an atomization as is possible and to this end, it has been proposed to heat the fuel/air mixture prior to its delivery to the combustion chambers of the engine. Heating of the mixture has generally been achieved by passing that mixture in heat exchanging relationship with the exhaust gases of the engine, with the engine lubricant or with the engine coolant.

A typical arrangement is that illustrated in Canadian Pat. No. 1,070,197 issued Jan. 22, 1980 to Nissan Motor Company, Limited of Japan. In that patent there is disclosed a system in which a heat exchange chamber is formed in the intake manifold of the engine and engine coolant is directed to that chamber from the water jacket of the engine. A problem arises with such prior art arrangements during start-up periods when the engine is cold. During these periods, rather than improving vaporization or gasification of the fuel, the heat exchanger will tend to cause the fuel to be condensed or cause individual droplets of fuel in the mixture to coalesce thus seriously impairing engine efficiency. To alleviate this problem, it has been necessary to use a very simple heat exchanger having a relatively small heat exchanging surface, and one in which the path followed by the fuel is not substantially increased over the path which it would follow if the heat exchanger was not present. This technique, while sacrificing the most efficient preheating of the fuel air mixture for normal hot operation of the engine, reduces the area over which the fuel may condense and the length of the path over which the droplets of fuel may coalesce, during cold operation of the engine. This technique has represented at best a compromise between the preheating which is optimum to obtain vaporization during normal hot operation of the engine, and the need to avoid condensation or coalescing of the fuel during cold operation.

BRIEF SUMMARY OF THE INVENTION

The present invention seeks to provide a system in which this compromise is avoided, and to this end there is provided a heat exchanger having a large heat exchanging surface area consistent with optimum vaporization of the fuel and the means permitting the fuel air mixture to bypass the heat exchanger when the engine is cold.

According to one aspect of the present invention, there is provided a fuel system for an internal combustion engine comprising mixing means for forming a mixture of fuel and air, conduit means for delivering mixed fuel and air from the mixing means to a combustion site of said engine, a heat exchanger disposed in said conduit means, means for delivering a heating medium to one side of said heat exchanger, said medium being heated by engine operation and means operative alternatively to direct mixed fuel and air through another side of said heat exchanger and to cause said mixed fuel and air to bypass said other side of said heat exchanger. Preferably, the heating medium is engine coolant, and it is delivered to one side of the heat exchanger from a hot region of the engine coolant system and returned to a cooler region of the coolant system. The heat exchanger most desirably includes means defining an extensive heat exchanging path for the fuel air mixture, and the bypass means defines a short path from said mixing means to said combustion site of the engine. It will be recognized that the bypass may be operated manually, or it may be operated in response to engine temperature, or any known means.

DESCRIPTION OF THE FIGURES OF THE DRAWINGS

An embodiment of the present invention is illustrated in the accompanying drawings in which.

Figure 1:
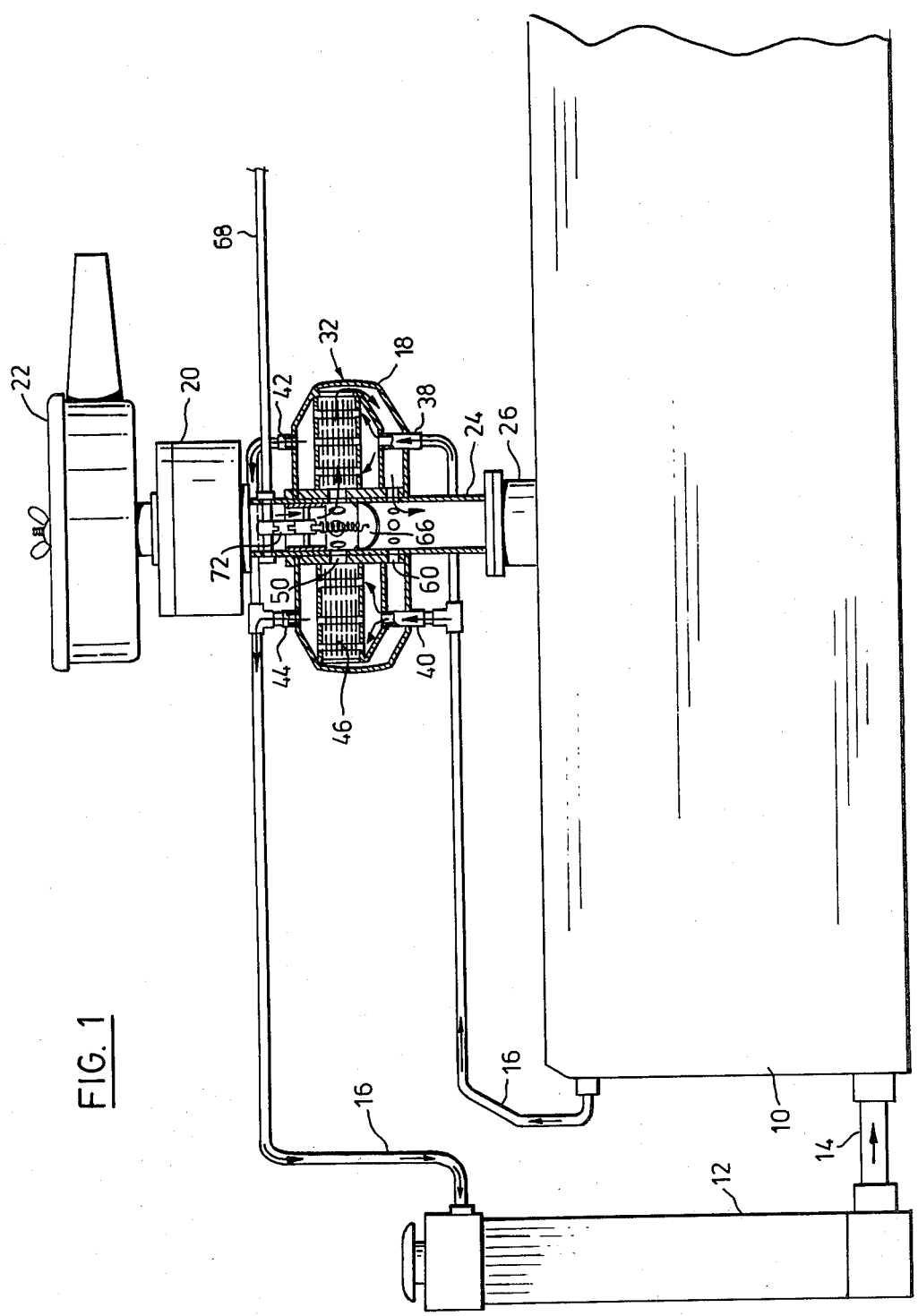
FIG. 1 is a part cross sectional, part elevational view of an automotive engine with a fuel system according to the present invention; and, FIG. 2 is a partly cut away perspective view of a component of the fuel system of FIG. 1.

The engine 10 of FIG. 1 has a cooling system which comprises a radiator 12, a coolant delivery line 14, leading from the lower header of the radiator to the engine water jacket (not shown in the drawings), and a return line 16 by which hot coolant is returned from the water jacket to the top header of radiator 12. A heat exchanger 18, more fully described hereinafter with reference to FIG. 2, is disposed in the return line 16.

The fuel supply system for the engine comprises a tank, not shown in the drawings but of entirely conventional form and a fuel pump also not shown, but again of entirely conventional form, delivering to a carburetor 20 which produces an atomized fuel mixed with air delivered through air filter 22. The mixed fuel and air issues to conduit means 24 which leads to a manifold 26 by which the mixed fuel and air is distributed to the cylinders of engine 10.

Figure 2:
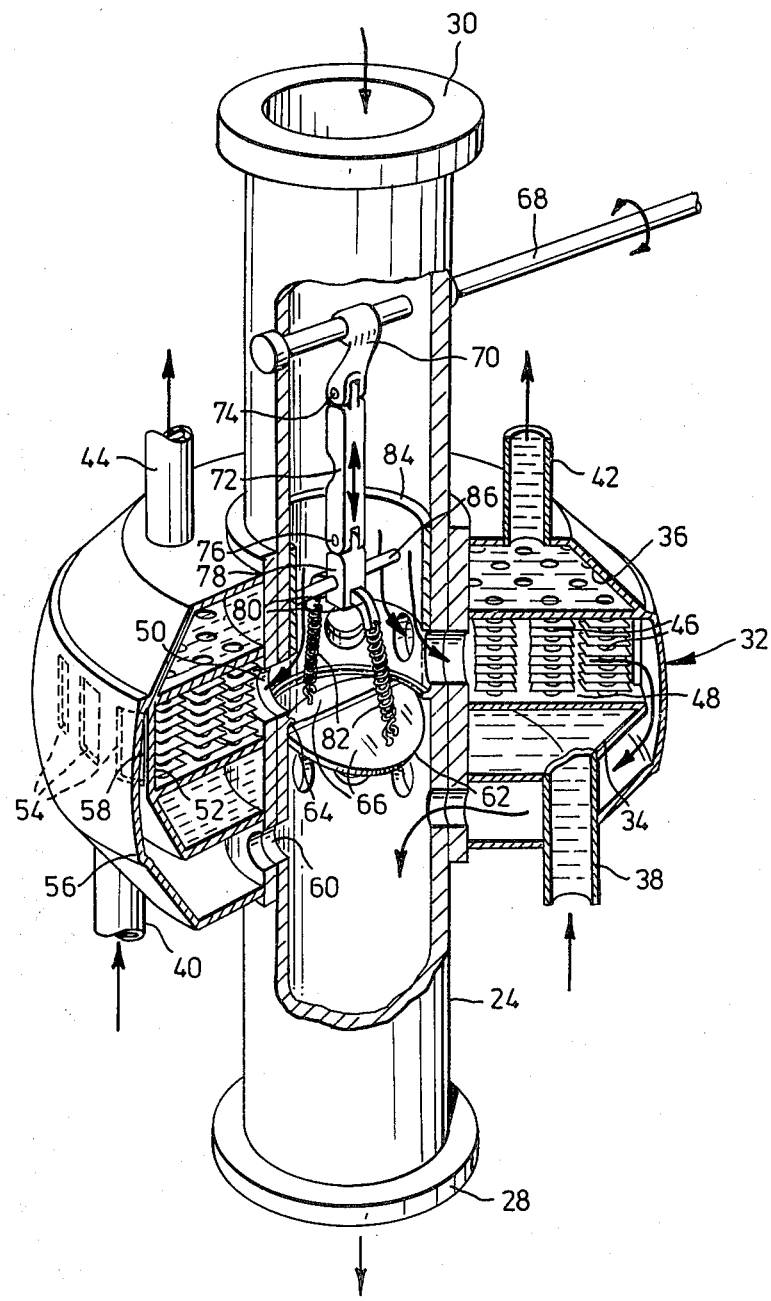

It is the heat exchanger and its relationship to the conduit means 24 which is at the core of this invention, and this structure is described more particularly with reference to FIG. 2. It will be seen from a consideration of that figure that the conduit 24 has a lower flange 28 by which it is connected to the manifold 26, and an upper flange 30 by which it is connected to carburetor 20. Surrounding the conduit is a heat exchanber 32 which comprises an annular inlet header 34, and a similar annular return header 36. Inlet conduits 38 and 40 lead to the header 34 and return conduits 42 and 44 lead from the return header 36.

A plurality of heat exchanging conduits 46 extend between the headers, through a heat exchange chamber 48, each of those conduits 46 having a plurality of fin-like heat exchanging plates secured thereto.

The conduit 24 has a plurality of ports 50 which lead to the heat exchange chamber 48, and an annular wall 52 bounding the heat exchanger 48 is provided with a plurality of generally rectangular ports 54. The heat exchanger body comprises an outer shell 56 so that heated fuel and air mixture passing through the heat exchanger, exits chamber 48 to an annular chamber 58 whence it passes in heat exchanging relationship with the inlet header 34 to return ports 60 in the conduit 24. It is most desirable that the inlet header be downstream, relative to the flow of fuel and air mixture of the return header. In this way, the mixture heated in the heat exchange chamber is not cooled by coming into contact with the cooler of the two headers.

A butterfly valve 62 is disposed in the conduit 24 between the ports 50 and ports 60. The valve comprises an annular seat 64 with an appropriate gasket and a pair of flaps 66 which are hinged together along a diameter. The valve is operable by means of the linkage which comprises a rotary shaft 68 to which a link 70 is fixed. Link 70 is pivoted to a link 72 as at 74 and at the lower end of link 72, a connection is made, as at 76 to a lower link 78 which has a pair of arms 80 projecting therefrom and to which springs 82 are connected. The opposite ends of the springs are connected to respective ones of the flaps 66 of the butterfly valve. Thus as the shaft 68 is rotated to move the linkage downwards, i.e. towards the carburetor, the valve is opened providing direct access from the carburetor to the manifold through conduit 24. To preclude the passage of any fuel air mixture into the heat exchanging chamber when the valve is opened, a sleeve 84 is slidably mounted within the conduit 24 and is connected to link 78 by a pin 86 so that as the linkage moves downwards, to move the valve to an open position, so the sleeve 84 is moved downwardly to obturate the inlet ports 50 leading to the heat exchange chamber 48.

As the valve is closed, upon upward movement of the linkage, the sleeve is moved upwardly and opens the ports 50 so that all fuel will then pass through the heat exchange chamber. Thus, it will be recognized that it is possible when the engine is cold simply to bypass the heat exchanger.

It will be recognized that the linkage may be operated manually, or it may be operated automatically, for example in response to a thermostat.

I claim:

1. A fuel system for an internal combustion engine comprising mixing means for forming a mixture of fuel and air, conduit means for directly delivering mixed fuel and air from a mixing means to a combustion site of said engine, a heat exchanger disposed about said conduit means, means for delivering a heating medium to said heat exchanger, said medium being heated by engine operation and means operatively associated with said conduit means causing the said mixed fuel and air to be diverted from said conduit means and to pass through said heat exchanger, said means operatively associated with said conduit means comprising inlet port means opening from said conduit to said heat exchanger, return port means disposed down stream of said inlet port means and opening from said heat exchanger to said conduit means and valve means disposed in said conduit means between said inlet and return port means, said valve means being movable between closed position in which fuel air mixture is caused to pass through said heat exchanger and an open position in which fuel air mixture is passed directly to said combustion site, said heat exchanger comprising an inlet header for heating medium, a return header for that medium, and a plurality of heat exchanging tubes extending between said headers and within a heat exchange chamber, said headers and said chamber being of annular form and wherein said conduit means for delivering mixed fuel and air from a mixing means to the combustion site includes a conduit section extending axially through said headers and said chamber.

2. A fuel system as claimed in claim 1 wherein said heating medium comprises engine coolant and said means for delivering the medium to said one side of said heat exchanger comprises conduit means leading from a hot region of the engine coolant system to the heat exchanger and from the heat exchanger to a cooler region of the coolant system.

3. A fuel system as claimed in claim 1 wherein said heat exchanger includes means defining an extensive heat exchanging path for the fuel air mixture.

4. A fuel system as claimed in claim 1 wherein said tubes are in heat exchanging relationship with a plurality of heat exchanging plates.

5. A fuel system as claimed in claim 1 wherein closure means are associated with said inlet port means, and operating means associated with said valve means and operative upon opening of said valve means, are effective to cause said closure means to move to close said inlet ports.

6. A fuel system as claimed in claim 1 wherein said inlet header is downstream of said outlet header relative to the flow of the fuel air mixture.

* * * * *